United States Patent [19]

Atcheson

[11] Patent Number: 4,889,409
[45] Date of Patent: Dec. 26, 1989

[54] HEMISPHERICAL RETROREFLECTOR

[75] Inventor: Paul D. Atcheson, Boulder, Colo.

[73] Assignee: Ball Corporation, Muncie, Ind.

[21] Appl. No.: 156,185

[22] Filed: Feb. 16, 1988

[51] Int. Cl.$^4$ ............................................. G02B 5/126
[52] U.S. Cl. .................................... 350/104; 350/106; 350/416; 350/446
[58] Field of Search ................. 350/104, 105, 100, 97, 350/416, 320, 106, 446

[56] References Cited

U.S. PATENT DOCUMENTS

| | | | |
|---|---|---|---|
| 1,903,385 | 5/1938 | Schiller | 350/104 |
| 1,934,492 | 11/1933 | Garbarini | 350/104 |
| 2,968,228 | 1/1961 | Merritt | 350/416 |
| 3,334,345 | 8/1967 | Bradford | 350/104 |
| 3,863,064 | 1/1975 | Doyle et al. | |
| 3,874,784 | 4/1975 | Eigenmann | |
| 3,889,027 | 6/1975 | White | 350/104 |
| 3,963,309 | 6/1976 | Schwab | 350/104 |
| 3,981,557 | 9/1976 | Eigenmann | |
| 3,989,942 | 11/1976 | Waddoups | |
| 4,012,114 | 3/1977 | Eigenmann | |
| 4,123,140 | 10/1978 | Ryan et al. | |
| 4,134,008 | 1/1979 | de Corlieu et al. | |
| 4,143,263 | 3/1979 | Eichweber | |
| 4,145,111 | 3/1979 | Hansson et al. | |
| 4,192,576 | 3/1980 | Tung et al. | |
| 4,361,911 | 11/1982 | Buser et al. | |
| 4,411,553 | 10/1983 | Eigenmann | |
| 4,422,733 | 12/1983 | Kikuchi et al. | 350/416 |
| 4,457,625 | 7/1984 | Greenleaf et al. | |
| 4,511,210 | 4/1985 | Tung et al. | |
| 4,708,920 | 11/1987 | Orensteen et al. | |

OTHER PUBLICATIONS

Fundamentals of Optics (Fourth Edition) p. 19, 1976, by Jenkins and White.
Connes et al., "Near-Infrared Planetary Spectra by Fourier Spectroscopy. I. Instruments and Results," *Journal of the Optical Society of America*, vol. 56, No. 7, p. 896 (1966).
Baker, James G., "Optical Designs of Special Interest in the I.R." SPIE vol. 156, Modern Utilization of Infrared Technology IV (1978).

*Primary Examiner*—Rodney B. Bovernick
*Assistant Examiner*—Loha Ben
*Attorney, Agent, or Firm*—Sheridan, Ross & McIntosh

[57]  ABSTRACT

A retroreflector comprising two hemispheres of differing radii. The spherical surface of the first hemisphere is disposed towards a radiation source and the second hemisphere is provided with a reflective coating on its spherical surface. Means for modulating radiation from the retroreflector can be utilized within the retroreflector. In addition, smaller concentric inner hemispheres or a concentric inner sphere may be provided to correct chromatic and spherical aberrations produced by the retroreflector. Advantages obtainable with the disclosed retroreflector include consistent return efficiency over a large field of regard and consistent return efficiency over a wide spectral region.

15 Claims, 2 Drawing Sheets

HEMISPHERICAL RETROREFLECTOR

FIELD OF THE INVENTION

This invention relates to the field of retroreflectors and more particularly to both modulated and unmodulated retroreflectors in which consistent return efficiency, relative to retroreflector orientation, over a large field of regard is obtainable, and in which chromatic and spherical aberration may be compensated for.

BACKGROUND OF THE INVENTION

A retroreflector is an optical device used to reflect radiation beams from an associated radiation source back to a radiation sensor positioned at the source along paths substantially parallel to those of the corresponding incident beams. Known retroreflectors include cube corners, cat's eyes mirror systems, and embedded lens systems. Retroreflectors can be advantageously incorporated into a large variety of devices, e.g., devices used for determining the position of objects such as satellites, planes and ships; optical communication devices; and road signs and traffic markings.

Problems typically encountered with known retroreflectors include a small field of regard and inconsistent return efficiency over the field of regard. The field of regard is the portion of a retroreflector in which the retroreflector can receive radiation and is capable of reflecting a sufficient amount of such radiation back along substantially parallel paths to permit sensing. Typically it is a cone shaped sector that has its apex located within the retroreflector and is symmetrical to the axis of symmetry for the retroreflector. A field of regard is expressed in terms of the number of degrees of the corresponding angle at the field's apex and is measured transversely through the retroreflector axis. Therefore, for a retroreflector with a nearly hemispherical field of regard, the angle would approach 180°.

The return efficiency of a retroreflector is an indication of the amount of radiation from a source which is reflected back to the source by the retroreflector, and can be evaluated through the use of a radiation detection means located at the source. For the present purposes, radiation which is not reflected back to the source is disregarded when calculating return efficiency. In other words, radiation which is not retroreflected along a path substantially parallel to the incident beam is disregarded. A retroreflector with a consistent return efficiency will reflect a substantially constant proportion of incident radiation back towards the source irrespective of the orientation of the retroreflector to the source, provided that the incident radiation falls within the field of regard.

Cube corner retroreflectors are well known in the art and are disclosed, for example, in U.S. Pat. No. 4,143,263 by Eichweber, issued Mar. 6, 1979. Cube corners comprise three flat reflecting surfaces arranged at 90° angles to each other, with the interior surfaces producing a reflected beam which is parallel to the incident beam. One problem with cube corners is that the field of regard is typically limited to about 60°. Another problem encountered with cube corners is their typically inconsistent return efficiency. As the unit is tilted relative to the incident beam, the radiation collected by the unit is decreased by the cosine of the tilt angle, causing the total radiation returned to be reduced by the same proportion. In addition, as the unit is tilted, the return beam is spread by diffraction, again in proportion to the cosine of the tilt angle. The result is a decrease in retroreflected radiation detected at the radiation source proportional to the square of the cosine of the tilt angle of the retroreflecting unit. Additionally, because there are six different sequences for the three reflections used to produce the return beam, a mechanical misalignment of any single surface will produce a group of six return beams rather than a single beam.

A cat's eye retroreflecting system, as disclosed by Connes et al., Journal of the Optical Society of American, Vol. 56, No. 7, p. 896 (1966), consists of a concentric pair of spherical mirrors, the first of which is concave and produces a focus spot of a radiation source on a convex reflecting surface of a second mirror. This type of system is relatively large, has a small field of regard and is sensitive to mechanical misalignments and thermal deviations.

A common type of retroreflector system utilized on traffic signs and for road markings is known as an "embedded lens system." Such retroreflector systems are disclosed, for example, in U.S. Pat. No. 3,889,027 by White, issued June 10, 1975; U.S. Pat. No. 4,192,576 by Tung et al, issued Mar. 11, 1980; U.S. Pat. No. 4,708,920 by Orensteen et al., issued Nov. 24, 1987; and U.S. Pat. No. 4,511,210 by Tung et al., issued Apr. 16, 1985. Embedded lens retroreflector systems typically comprise transparent spheres or microspheres partially embedded in a reflective layer.

One problem with such systems is that they typically have a low field of regard. For example, it is noted in U.S. Pat. No. 4,511,210 that in embedded lens systems known prior to the disclosure in U.S. Pat. No. 4,511,210, the retroreflector return efficiency generally declines to less than three-quarters of its maximum value outside of a field of regard of about 70° (called the "three-quarter brightness angle"). The patent then discloses a system which retains three-quarter brightness within a field of regard equal to about 80° (See column 2, lines 49–57).

Another problem encountered with embedded lens systems is undesirably high aberration. This aberration is partially due to the small size of the lenses employed in embedded lens systems. As is disclosed in U.S. Pat. No. 3,889,027, the Federal specifications for retroreflective surfaces limit the thickness of the entire composite to less than 0.010 inch (See column 2, lines 18–36). As a result, the lenses embedded within this 0.010 inch layer must be extremely small.

As is apparent from the above, current retroreflectors suffer from a number of problems. For example, some current retroreflectors suffer a loss in return efficiency as a function of incident angle, usually proportional to the square of the cosine of the angle between the incident beam and the axis of symmetry for the retroreflector. This can be a severe restriction on the allowable orientation of the retroreflector relative to a radiation source. Additionally, current retroreflectors such as cube corners are sensitive to manufacturing errors, which for example may result in multiple, non-parallel return beams for a single incident beam. Furthermore, current retroreflecting systems such as cat's eye mirror systems are expensive, occupy a relatively large volume, are very sensitive to alignment errors introduced by manufacturing errors or thermal changes, and have a restricted field of regard. Embedded lens systems also typically have a limited field of regard and an undesirably high amount of aberration. Therefore, a retroreflector which provides the design flexibility required to compensate for the foregoing deficiencies would be advantageous.

One specific type of aberration which is often encountered with embedded lens and other lens systems is known as chromatic aberration. The indistinct color effects observed along the edges of images formed by a simple lens constitute what is known as the chromatic aberration of the lens. This aberration is due to the fact that the glass, or any other transparent substance out of which a lens may be constructed, disperses incident radiation (i.e., refracts light of different wavelengths by different amounts). The image formed by a concave, metal or silverbacked glass mirror is free from chromatic aberration since all incident radiation is reflected in the same direction. Therefore, retroreflectors which only employ mirrors, i.e., cube corners and cat's eye mirror systems, do not suffer from chromatic aberration while those which employ lenses, i.e., embedded lens systems, may suffer from chromatic aberration.

Another type of aberration which is encountered in both lens and mirror systems is spherical aberration. If the refracting surface of a lens or the reflecting surface of a mirror are spherical, the rays refracted through or reflected from the outer portions of these surfaces, as defined by reference to a center path between the radiation source and center of curvature for the surfaces, will be brought to a focus in a different plane than those rays on the center path, thus producing a blurring of the resultant image known as spherical aberration. This effect is more pronounced in short-focus lenses (e.g. embedded lens systems) and mirrors than in long-focus instruments, because the curvature of the surfaces of the short-focus instruments is greater. Because all of the retroreflectors described above incorporate lenses and/or mirrors, spherical aberration may be a problem if any of their surfaces are spherical. Therefore, it would be advantageous to produce a retroreflector in which the problems of chromatic and spherical aberration may be compensated for.

Not only is it useful to return reflected radiation beams along paths substantially parallel to the corresponding incident radiation beams, but it is also desirable in certain instances to modulate the return radiation beams. Modulation of retroreflective radiation is disclosed in, for example, U.S. Pat. No. 4,143,263 by Eichweber, issued Mar. 6, 1979; U.S. Pat. No. 4,134,008 by de Corlieu et al., issued Jan. 9, 1979; U.S. Pat. No. 3,989,942 by Waddoups, issued Nov. 2, 1976; U.S. Pat. No. 3,863,064 by Doyle et al, issued Jan. 28, 1975; and U.S. Pat. No. 4,361,911 by Buser et al., issued Nov. 30, 1982. However, because the systems disclosed in the above-mentioned patents employ retroreflectors generally of the types described above, they suffer from the same disadvantages noted above. Therefore, it would be advantageous to produce a modulated retroreflector which does not suffer from the disadvantages discussed hereinbefore.

In summary, it would be desirable to provide a retroreflector in which one or more of the following advantages are obtainable: (1) A retroreflector with a field of regard approaching 180°; (2) A retroreflector with substantially consistent return efficiency as a function of incident beam angle relative to the retroreflector orientation within its field of regard; (3) A retroreflector with simple, rugged construction and relative intolerance to manufacturing errors and thermal effects; (4) A compact retroreflector; (5) A retroreflector with high retroreflector efficiency over a wide spectral band; (6) A retroreflector with minimal spherical aberration; and (7) A modulating retroreflector.

SUMMARY OF THE INVENTION

In accordance with one embodiment of the present invention, a hemispherical retroreflector is provided. The hemispherical retroreflector comprises two hemispheres, each hemisphere constructed of a substantially transparent material. The planar portion of the first hemisphere is centrally adjoined to the planar portion of the second hemisphere, so that the spherical surfaces of each are oriented in opposite directions. The spherical surface of the second hemisphere is treated in order to reflect internally incident radiation.

In use, incident radiation from a radiation source enters the retroreflector through, and is refracted at, the first, untreated spherical surface. The radiation continues through the retroreflector and is reflected off the second, treated spherical surface. The radiation is then again refracted as it passes back out through the first hemisphere. The index of refraction and the radius of curvature of each of the two hemispheres are selected so that radiation incident on the first spherical surface is internally brought to focus on the treated second spherical surface. Each hemisphere has the same index of refraction. If the index of refraction is greater than 2, the radius of the first hemisphere is greater than the radius of the second hemisphere; if it is less than 2, the radius of the first hemisphere is less than the radius of the second.

In a preferred embodiment, the retroreflector of the present invention comprises two smaller hemispheres located concentrically within at least two larger hemispherical shells. Each of the two inner hemispheres has the same index of refraction as the other, which is lower than the indexes of refraction of the larger hemispherical shells, which need not be equal. Alternatively a single sphere may be used in place of the two smaller inner hemispheres. Through proper selection of the indexes of refraction and the radii of curvature of the outer hemispherical shells and the inner hemispheres (or inner sphere), chromatic and spherical aberration can be reduced or eliminated.

In a further preferred embodiment, the retroreflector of the present invention contains means to modulate the retroreflected radiation. The modulation means are located at the center of curvature of the retroreflector.

It is possible to obtain a field of regard approaching 180° with the retroreflector design of the present invention. With a field of regard approaching 180°, practically any portion of the first spherical surface may be oriented toward a radiation source and retroreflection will still occur. In addition, it is possible to obtain a return efficiency that is substantially consistent within the field of regard. With a substantially consistent return efficiency, the intensity of the retroreflected radiation, as measured at the location of the radiation source, is independent of the retroreflector orientation, within the limits of the field of regard.

The retroreflector design of the present invention results in a small, predictable variation in the fraction of radiation returned within a beam centered on the return beam as a function of manufacturing errors and thermal change during operation.

Modulation means may be readily incorporated into the unit, resulting in a compact modulation retroreflector, consisting only of the bonded refracting components, the modulation means and the drive electronics therefor, and a comparably-sized mounting fixture.

When two inner hemispheres or a single inner sphere are properly incorporated into the unit, the retroreflecting and modulation efficiency are relatively independent of illumination wavelength over a wide range of incident wavelengths, such as over the full visible spectrum, and spherical aberration is reduced.

DETAILED DESCRIPTION OF THE INVENTION

Figure 1:
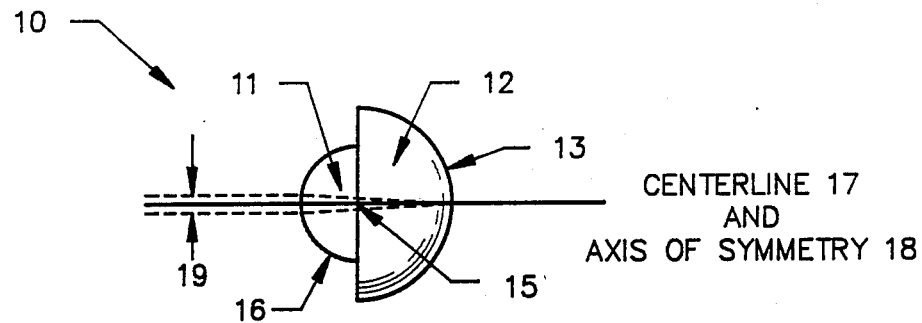
FIG. 1 is a side view of one embodiment of the retroreflector of the present invention in which the center line of the incident beam and the axis of symmetry of the retroreflector are aligned.

The retroreflector 10 of the present invention, shown in FIG. 1, consists of two hemispheres 11 and 12, adjoined to form a single unit. The two hemispheres 11 and 12 have the same index of refraction in order to avoid comatic aberration. The two hemispheres 11 and 12, and any bonding agent used to join them, should all permit high radiation transmission in the design wavelength band. The spherical surface 13 of hemisphere 12 is rendered reflective modern to internally reflect incident radiation, e.g., by coating with a reflective coating, such as a metallic or dielectric coating.

The radius of curvature and the index of refraction for each of the two hemispheres 11 and 12 are selected so that a radiation beam which is incident on spherical surface 16 will be focused on spherical surface 13 and reflected back to the radiation source. The radius of curvature of hemisphere 12 divided by the radius of curvature of hemisphere 11 is equal to $1/(n-1)$, wherein n is the index of refraction of the hemispheres determined at the design wavelength of the radiation source utilized in connection with the retroreflector 10.

Radiation which emanates from a distant source/collecting (or sensing) unit and is incident on the spherical surface 16 of first hemisphere 11 is focused approximately at the spherical surface 13 of the second hemisphere 12. A line 17 drawn from the distant source, passing through the common center of curvature 15 for the two hemispheres 11 and 12, is referred to as the return beam centerline 17. A portion of the incident beam in the immediate vicinity, indicated by the area 19, of the centerline will be focused accurately onto the surface 13 and accurately reflected back through the same area 19, from which it will be transmitted directly back to the distant collecting unit located at the source. Area 19 is the effective aperture of the retroreflector. At least 90%, and preferably greater than 99%, of the incident radiation which strikes the retroreflector within this area 19 is retroreflected back to the source. More importantly, in the most preferred embodiment, approximately 99% of the radiation received at the collecting unit from the retroreflector 10 will have passed through the effective aperture 19.

As can be appreciated by those skilled in the art, the size of the effective aperture area 19 will be a function of the size of the aperture of the collecting unit, the size of the retroreflector, the index of refraction of the retroreflector material, and the distance separating the source/collector unit and the retroreflecting unit 10. Of critical importance, it should be understood that the ratio of the diameter of the effective aperture 19 over the radius of curvature for the first hemisphere 11 will decrease as the radius of curvature for the first hemisphere 11 is increased. That is, the relative effective aperature for retroreflector 10 will decrease as the size of the first hemisphere 11 is increased. A smaller relative aperture results in a larger field of regard.

Figure 2:
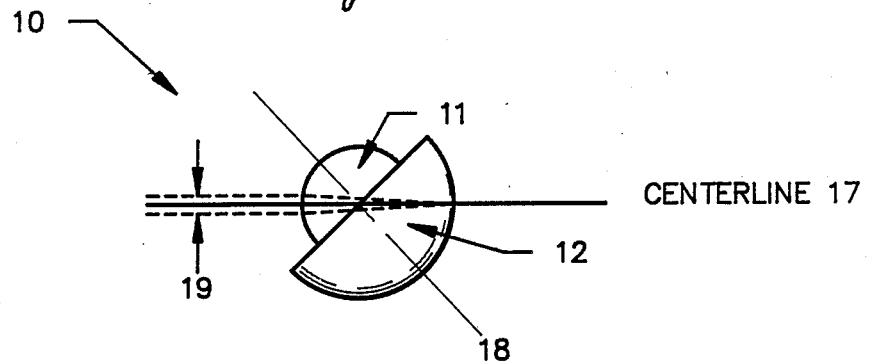
FIG. 2 is an illustration of the retroreflector shown in FIG. 1 with the retroreflector tilted relative to the incident beam center line.

As the angle between the centerline 17 and the unit axis of symmetry 18 changes, area 19 remains constant in size in the preferred embodiment, as shown in FIG. 2, until an angle approaching 90° is reached and the area becomes vignetted by the junction of the hemispheres 11 and 12. Therefore, a smaller relative effective aperture permits the retroreflector 10 to be tilted to a greater degree before vignetting occurs. However, one tradeoff that occurs when the size of the relative effective aperture is reduced, is that the total return efficiency of the collector unit is also reduced.

Figure 3:
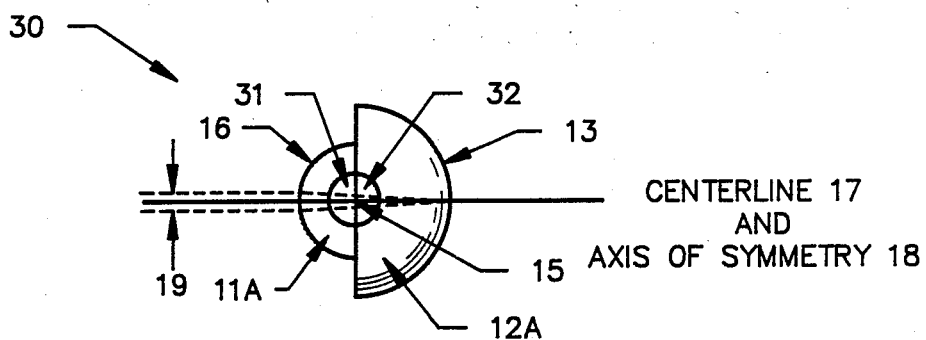
FIG. 3 is an illustration of another embodiment of the retroreflector of the present invention which comprises the retroreflector of FIG. 1 incorporating two inner hemispheres.

FIG. 3 shows another embodiment of the retroreflector 30 of the present invention. As in all the figures, those elements which are similar in the various figures carry like reference numbers. The embodiment shown in FIG. 3 is analogous to that shown in FIG. 1 except in FIG. 3 two inner hemispheres 31 and 32 have been included. Alternatively, 31 and 32 may be a single sphere. For the sake of simplicity, 31 and 32 will be referred to as two separate inner hemispheres even though they may comprise a single monolithic sphere. The two inner hemispheres 31 and 32 are surrounded by outer hemispherical shells 11a and 12a. These outer hemispherical shells 11a and 12a are similar to 11 and 12 of FIG. 1 except for the portion removed to allow for the insertion of the inner hemispheres 31 and 32. Although only two hemispherical shells are shown in FIG. 3, it should be understood that in alternative embodiments additional concentric outer hemispherical shells may surround those shown.

The indexes of refraction of the two inner hemispheres 31 and 32 are equal to each other and to the index of refraction of any bonding agent used to adjoin them. Therefore the return efficiency of the radiation which passes through the planar interface separating the two inner hemispheres 31 and 32 is not unduly affected by comatic aberration. The two hemispherical shells 11a and 12a have indexes of refraction greater than the index of refraction of the two inner hemispheres 31 and 32. The indexes of refraction of the shells 11a and 12a need not be equal to each other when inner hemispheres 31 and 32 are employed because the retroreflected light does not pass through their planar interface and therefore comatic aberration is not a problem.

All of the spherical surfaces are concentric. The various radii of curvature are determined in order to correct for chromatic aberration within the spectral band of interest and from the desire to optimize the effects of spherical aberration. The use of the inner hemispheres provides for both an enlargement of the area 19 and a reduction in the diffraction effects outside the area 19. By increasing the effective aperture area 19 the total return efficiency is increased, however, a smaller field of regard also results.

Figure 4:
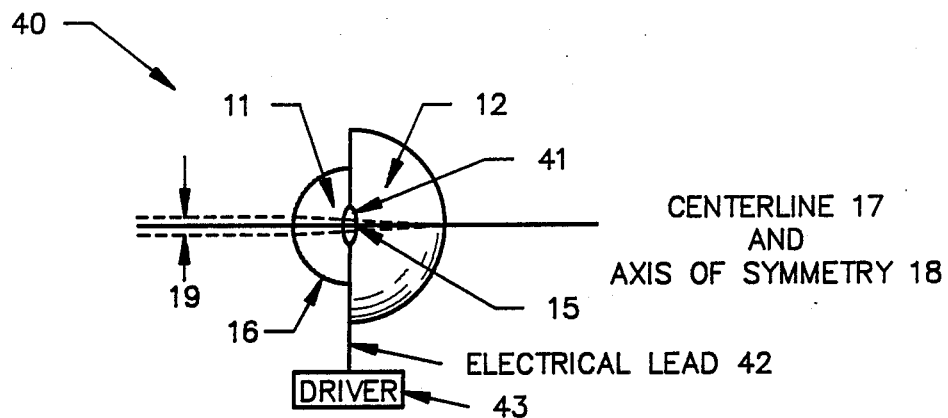
FIG. 4 is yet another embodiment of the retroreflector of the present invention illustrating the retroreflector of FIG. 1 incorporating modulation means.

Yet another embodiment of the retroreflector 40 of the present invention is shown in FIG. 4. This retroreflector 40 is analogous to the retroreflector 10 shown in FIG. 1, except that a means for modulating radiation 41 has been added at the common center of curvature 15. The modulation means 41 has an optical transmission which is controlled by the drive electronics 43 which are connected to the modulation means 41 by an electrical lead 42.

The size of the modulation means must be sufficient in order to cover the effective aperture area 19 projected to the common center of curvature. The modulator, which can also be considered as an optical switch, can comprise any suitable means known in the art. For example, the modulator can be in the form of a thin film, a liquid crystal, a potassium dihydrogen phosphate electrooptic modulator, a piezo-ceramic modulator, a Kerr cell, a Pockel cell, or a Stark cell.

Figure 5:
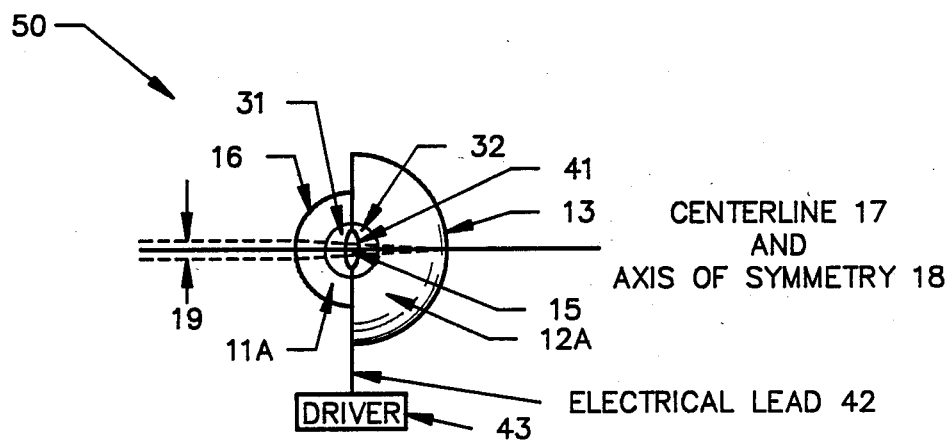
FIG. 5 is an illustration of still another embodiment of the retroreflector of the present invention illustrating the retroreflector of FIG. 3 incorporating modulation means.

Yet another embodiment of the retroreflector 50 of the present invention is shown in FIG. 5. This embodiment incorporates the inner spheres 31 and 32 as shown in FIG. 3 with the modulation means 41 as shown in FIG. 4. In this way, a retroreflector is provided which can be modulated, and in which the effects of spherical aberration may be optimized.

Due to the relationship between the size of the retroreflector and the size of the effective aperture area and the field of regard, the actual size of the retroreflector is an important design consideration. For example, a retroreflector with a first hemisphere 11 having a radius of curvature of 1.6 inches provides for a field of regard of approximately 160°. Such a retroreflector has been found to provide an acceptable return efficiency in ranging systems wherein the distance between the source/collecting unit and retroreflector is approximately 6.2 miles (10 km.) or less. Preferably the size of the smaller of the two outer hemispheres (or hemispherical shells as the case may be) is greater than ⅛ of an inch, and the size of the larger of the two outer hemispheres (or hemispherical shells) is less than 10 inches. For example, in the embodiment of the invention comprising two hemispheres of differing radii, the smaller radius may be ¼ of an inch and the larger radius may be ½ of an inch. In such an instance, the index of refraction for each of the two hemispheres would be equal to 1.5.

The retroreflectors with modulating means (shown in FIGS. 4 and 5) can be used as components in an optical communication systems. Typically, in such systems, a radiation source/collecting unit is employed to send modulated and unmodulated radiation beams to the retroreflector. The modulated radiation beams sent to the retroreflector carry encoded information which the retroreflector is capable of decoding. The unmodulated radiation beams sent to the retroreflector are selectively modulated by the retroreflector and reflected back to the source/collecting unit, thereby sending encoded information back to the radiation source/collecting unit. Examples of specific uses for such an optical communication means would include data transfer from a remotely piloted vehicle to a stationary command post and remote interrogation of a stationary modulating retroreflector by a mobile command post.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A retroreflector which comprises:
    (a) a first hemisphere having radius r1 and comprising
        (i) a transparent spherical surface which, during use receives incident radiation, and
        (ii) a transparent planar surface, and
    (b) a second hemisphere having radius r2 wherein r2/r1 signals 1/(n-1), wherein n is the index of refraction of the hemispheres determined at the design wavelength of the retroreflector and the index of refraction of the two hemispheres is less than 2, said second hemisphere comprising:
        (i) a specular spherical surface which, during use reflects incident radiation substantially focused thereon, and
        (ii) a transparent planar surface wherein the planar surface of said first hemisphere is centrally adjoined to the planar surface of said second hemisphere, and
    wherein radiation reflected from said retroreflector propagates along a path substantially parallel to the path of said incident radiation.

2. A retroreflector which comprises:
    (a) a first hemispherical shell having radius r1 and comprising
        (i) a transparent spherical surface which, during use receives incident radiation, and
        (ii) a planar surface,
    (b) a second hemispherical shell having radius r2 wherein r2 is greater than r1 and the indexes of refraction of the two hemispherical shells are less than 2, said second hemispherical shell comprising:
        (i) a specular spherical surface which, during use reflects incident radiation substantially focused thereon, and
        (ii) a planar surface wherein the planar surface of said first hemispherical shell is adjoined to the planar surface of said second hemispherical shell, and
    (c) third and fourth hemispheres, or a single sphere, concentrically located within the first and second hemispherical shells, wherein the index of refraction is the same for said third and fourth hemispheres or single sphere and is different from the index of refraction of the first hemispherical shell and the index of refraction of the second hemispherical shell, and
    wherein radiation reflected from said retroreflector propagates along a path substantially parallel to the path of said incident radiation.

3. The retroreflector of claim 2 further comprising an optical modulation cell located at the common center of curvature of said retroreflector.

4. A retroreflector which comprises:
    (a) a first hemisphere having radius r1 and comprising
        (i) a transparent spherical surface which, during use receives incident radiation, and
        (ii) a transparent planar surface,
    (b) a second hemisphere having radius r2 wherein r2 is greater than r1 and the index of refraction of the two hemispheres is less than 2, said second hemisphere comprising:
  (i) a specular spherical surface which, during use reflects incident radiation substantially focused thereon, and
  (ii) a transparent planar surface wherein the planar surface of said first hemisphere is centrally adjoined to the planar surface of said second hemisphere, and
(c) an optical modulation cell located at the common center of curvature of said first and second hemispheres, and
wherein radiation reflected from said retroreflector propagates along a path substantially parallel to the path of said incident radiation.

5. A retroreflector which comprises:
(a) a first hemisphere having radius r1 of at least about ⅛ of an inch and comprising
  (i) a transparent spherical surface which, during use receives incident radiation, and
  (ii) a transparent planar surface, and
(b) a second hemisphere having radius r2 wherein r2 is greater than r1 and the index of refraction of the two hemispheres is less than 2, said second hemisphere comprising:
  (i) a specular spherical surface which, during use reflects incident radiation substantially focused thereon, and
  (ii) a transparent planar surface wherein the planar surface of said first hemisphere is centrally adjoined to the planar surface of said second hemisphere, and
wherein radiation reflected from said retroreflector propagates along a path substantially parallel to the path of said incident radiation.

6. A retroreflector which comprises:
(a) a first hemisphere having radius r1 and comprising
  (i) a transparent spherical surface which, during use receives incident radiation, and
  (ii) a transparent planar surface, and
(b) a second hemisphere having radius r2 of less than about ten inches wherein r2 is greater than r1 and the index of refraction of the two hemispheres is less than 2, said second hemispheres comprising:
  (i) a specular spherical surface which, during use reflects incident radiation substantially focused thereon, and
  (ii) a transparent planar surface wherein the planar surface of said first hemisphere is centrally adjoined to the planar surface of said second hemisphere, and
wherein radiation reflected from said retroreflector propagates along a path substantially parallel to the path of said incident radiation.

7. A method for retroreflecting radiation comprising the steps of:
(a) providing a radiation beam incident on an outer surface of a first hemispherical member having radius r1;
(b) refracting by said first hemispherical member the radiation in the immediate vicinity of the center line of the incident radiation beam;
(c) providing a hemispherical reflective surface, having radius r2, wherein r1 is different from r2, at substantially the focal point of the refracted radiation;
(d) providing a spherical surface refracting means located between, and concentric with, said outer surface of said first hemispherical member and said hemispherical reflected surface in order to correct chromatic and spherical abberation, and
(e) reflecting and refracting said radiation beam in a manner such that radiation exits from said retroreflector along a path substantially parallel to that of the incident radiation beam.

8. A method for retroreflecting radiation comprising the steps of:
(a) providing a radiation beam incident on an outer surface of a first hemispherical member;
(b) refracting by said first hemispherical member the radiation in the immediate vicinity of the center line of the incident radiation beam;
(c) providing a hemispherical reflective surface at substantially the focal point of the refracted radiation;
(d) reflecting and refracting said radiation beam in a manner such that radiation exits from said retroreflector along a path substantially parallel to that of the incident radiation beam, and
(e) modulating the retroreflected radiation by a modulator.

9. A retroreflector which comprises:
(a) a first hemisphere having radius r1 and comprising
  (i) a transparent spherical surface which, during use receives incident radiation, and
  (ii) a transparent planar surface, and
(b) a second hemisphere having radius r2 wherein the index of refraction of the two hemispheres is greater than 2 and radius r2 is less than radius r1, said second hemispheres comprising:
  (i) a specular spherical surface which, during use reflects incident radiation substantially focused thereon, and
  (ii) a transparent planar surface wherein the planar surface of said first hemisphere is centrally adjoined to the planar surface of said second hemisphere, and
wherein radiation reflected from said retroreflector propagates along a path substantially parallel to the path of said incident radiation.

10. The retroreflector of claim 9 wherein the ratio of the radius of curvature of said second hemisphere to the radius of curvature of said first hemisphere is equal to 1/(n-1), wherein n is the index of refraction of the hemispheres determined at the design wavelength of the retroreflector.

11. The retroreflector of claim 9 further comprising an optical modulation cell located at the common center of curvature of said first and second hemispheres.

12. The retroreflector of claim 9 wherein the radius of the smaller hemisphere is at least about ⅛ of an inch.

13. The retroreflector of claim 9 wherein the radius of the larger hemisphere is less than about 10 inches.

14. A retroreflector which comprises:
(a) A first hemispherical shell having radius r1 and comprising
  (i) a transparent spherical surface which, during use receives incident radiation, and
  (ii) a planar surface, and
(b) a second hemispherical shell having radius r2 wherein the indexes of refraction of the two hemispherical shells are greater than 2 and radius r2 is less than radius r1, said second hemispherical shell comprising:

(i) a specular spherical surface which, during use reflects incident radiation substantially focused thereon, and (ii) a planar surface wherein the planar surface of said first hemispherical shell is adjoined to the planar surface of said second hemispherical shell, and (c) third and four hemispheres, or a single sphere, concentrically located within the first and second hemispherical shells, wherein the index of refraction is the same for said third and fourth hemispheres or single sphere and is different from the index of refraction of the first hemispherical shell and the index of refraction of the second hemispherical shell, and wherein radiation reflected from said retroreflector propagates along path substantially parallel to the path of said incident radiation.

15. The retroreflector of claim 14 further comprising an optical modulation cell located at the common center of curvature of said retroreflector.

* * * * *

UNITED STATES PATENT AND TRADEMARK OFFICE
CERTIFICATE OF CORRECTION

PATENT NO. : 4,889,409

DATED : December 26, 1989

INVENTOR(S) : Paul D. Atcheson

It is certified that error appears in the above-identified patent and that said Letters Patent is hereby corrected as shown below:

Column 2, lines 10 and 11, delete "American" and insert therefor --America--.

Column 3, line 35, delete "and-" and insert therefor --and--.

Column 3, line 50, delete "al," and insert therefor --al.,--.

Column 5, line 40, delete "modern" and insert therefor --in order--.

Column 8, line 15, delete "signals" and insert therefor --equals--.

Column 9, line 44, delete "hemispheres" and insert therefor --hemisphere--.

Column 10, line 2, delete "reflected" and insert therefor --reflective--.

UNITED STATES PATENT AND TRADEMARK OFFICE
CERTIFICATE OF CORRECTION

PATENT NO. : 4,889,409

DATED : December 26, 1989

INVENTOR(S) : Paul D. Atcheson

It is certified that error appears in the above-identified patent and that said Letters Patent is hereby corrected as shown below:

Column 11, line 8, delete "four" and insert therefor --fourth--.

Signed and Sealed this

First Day of January, 1991

Attest:

HARRY F. MANBECK, JR.

*Attesting Officer*          *Commissioner of Patents and Trademarks*